(12) United States Patent
Homan et al.

(10) Patent No.: US 7,201,010 B2
(45) Date of Patent: Apr. 10, 2007

(54) COMPRESSOR CONTROL SYSTEM FOR VEHICLE AIR CONDITIONER

(75) Inventors: Toshinobu Homan, Obu (JP); Yuji Takeo, Toyoake (JP); Mitsuyo Oomura, Hekinan (JP)

(73) Assignee: Denso Corporation, Kariya (JP)

( * ) Notice: Subject to any disclaimer, the term of this patent is extended or adjusted under 35 U.S.C. 154(b) by 413 days.

(21) Appl. No.: 10/786,933

(22) Filed: Feb. 25, 2004

(65) Prior Publication Data

US 2004/0168449 A1 Sep. 2, 2004

(30) Foreign Application Priority Data

Feb. 28, 2003 (JP) .............................. 2003-053709

(51) Int. Cl.
*F25D 25/00* (2006.01)
(52) U.S. Cl. ................................... 62/228.4
(58) Field of Classification Search ................ 62/228.4
See application file for complete search history.

(56) References Cited

U.S. PATENT DOCUMENTS

| 4,481,784 | A | * | 11/1984 | Elmslie ........................ 62/133 |
| 5,441,122 | A | * | 8/1995 | Yoshida ....................... 180/65.2 |
| 5,483,805 | A | * | 1/1996 | Fujii et al. .................... 62/158 |
| 5,506,486 | A | * | 4/1996 | Hayashi et al. ............. 318/808 |
| 5,765,383 | A | * | 6/1998 | Inoue ........................... 62/209 |
| 5,793,623 | A | * | 8/1998 | Kawashima et al. ..... 363/56.05 |
| 5,934,094 | A | * | 8/1999 | Itoh et al. ...................... 62/222 |
| 6,082,971 | A | * | 7/2000 | Gunn et al. .................... 417/32 |
| 6,178,760 | B1 | * | 1/2001 | Tanaka et al. ................. 62/154 |
| 6,200,021 | B1 | * | 3/2001 | Mitsutani et al. ............... 374/1 |
| 6,287,081 | B1 | * | 9/2001 | Tamegai et al. .............. 417/15 |
| 6,330,909 | B1 | * | 12/2001 | Takahashi et al. .......... 165/202 |
| 6,986,645 | B2 | * | 1/2006 | Iwanami et al. .............. 417/16 |

FOREIGN PATENT DOCUMENTS

JP 2000-13901 1/2000

* cited by examiner

*Primary Examiner*—Cheryl Tyler
*Assistant Examiner*—Gene L. Bankhead
(74) *Attorney, Agent, or Firm*—Harness, Dickey & Pierce, PLC

(57) ABSTRACT

In a compressor control system for a vehicle air conditioner, a hybrid ECU of the vehicle controls a rotation speed of a compressor electric motor. In this case, an output circuit, which outputs a driving signal for driving the compressor electric motor, only needs to be newly provided in the hybrid ECU when a hybrid vehicle or an electric vehicle is manufactured based on an engine vehicle. Therefore, a high cost is not caused even when the output circuit is provided in the hybrid ECU which should be newly designed and manufactured. In addition, because the output circuit does not need to be provided in an air-conditioning ECU which is an existing component of the engine vehicle, the air-conditioning ECU in the engine vehicle can be directly applied to that in the hybrid vehicle without a substantial hardware change. Therefore, design cost can be reduced.

15 Claims, 8 Drawing Sheets

COMPRESSOR CONTROL SYSTEM FOR VEHICLE AIR CONDITIONER

CROSS REFERENCE TO RELATED APPLICATION

This application is based on Japanese Patent Application No. 2003-53709 filed on Feb. 28, 2003, the disclosure of which is incorporated herein by reference.

BACKGROUND OF THE INVENTION

1. Field of the Invention

The present invention relates to a compressor control system for a vehicle air conditioner. In the compressor control system, an electric motor for driving a compressor is controlled by a driving electronic control unit that controls a driving of the vehicle.

2. Description of Related Art

In a conventional air conditioner (e.g., JP-A-2000-318435) of a vehicle such as a hybrid vehicle and an electric vehicle, a compressor in a refrigerant cycle system of the air conditioner is driven by an electric motor. Here, the hybrid vehicle is a vehicle which drives while a driving mode is switched between a battery driving mode by an electric motor and an engine driving mode. The electric vehicle is a vehicle which drives only by using a battery.

As shown in FIG. 11A, the above air conditioner includes an air-conditioning electronic control unit (ECU) 107. The air-conditioning ECU 107 controls operation of interior air-conditioning components of the air conditioner. Specifically, the air-conditioning ECU 107 controls a rotation speed of a compressor electric motor 47 through a compressor inverter 48, so as to control a compressor 41.

Although not shown in the above patent document of JP-A-2000-318435, the air-conditioning ECU 107 generally includes devices such as a microcomputer 107a, an input circuit and an output circuit 107c. The output circuit 107c outputs a driving signal for driving the compressor electric motor 47 based on an output signal from the microcomputer 107a.

An air conditioner shown in FIG. 11B is mounted in an engine vehicle which drives only by an engine. In this air conditioner, a compressor 41 is also driven only by the engine. Therefore, a rotation speed of the compressor 41 is dependently determined by a rotation speed of the engine. Accordingly, the compressor 41 is intermittently driven by controlling an electromagnetic clutch 49 which transmits motive power of the engine to the compressor 41. Otherwise, the compressor 41 is driven by controlling an electromagnetic valve (not shown), so that a discharge amount of the compressor 41 is adjusted. In this air conditioner, an air-conditioning ECU 107' includes an output circuit 107c', which outputs a driving signal to the electromagnetic clutch 49, or an output circuit which outputs a driving signal to the electromagnetic valve.

Accordingly, the hardware structure of the air-conditioning ECU 107, which is used for the hybrid vehicle or the electric vehicle and includes the output circuit 107c for outputting the driving signal for the compressor electric motor 47, is quite different from that of the air-conditioning ECU 107', which is used for the engine vehicle and includes the output circuit 107c' for outputting the driving signal for the electromagnetic clutch 49 or the electromagnetic valve.

In some cases, the hybrid vehicle or the electric vehicle is manufactured based on the engine vehicle. In this case, existing parts of the engine vehicle are used as much as possible in order to reduce design cost. However, the air-conditioning ECU 107' for the engine vehicle cannot be used as the air-conditioning ECU 107 for the hybrid vehicle or the electric vehicle without a hardware change. Therefore, the hardware design of the air-conditioning ECU 107' needs a substantial change, in order to be used for the air-conditioning ECU 107.

SUMMARY OF THE INVENTION

In view of the foregoing problems, it is an object of the present invention to apply an air-conditioning electronic control unit for a compressor driven by an engine to a control system for a compressor driven by an electric motor without a substantial design change of a hardware structure so that cost can be reduced.

According to the present invention, a compressor control system of an air conditioner is mounted in a vehicle that includes a driving electric motor for driving the vehicle, a main battery for supplying electric power of a high voltage to the driving electric motor, and a driving electronic control unit which has at least one of a function for controlling operation of an electric actuator driven when being applied with the high voltage of the main battery, a function for controlling a drive-power switching of the vehicle between the driving electric motor and an engine of the vehicle and a function for controlling a charge and a discharge of the main battery. Further, the compressor control system includes a compressor which is provided in a refrigerant cycle of the air conditioner for performing air-conditioning in a vehicle compartment, and a compressor electric motor for driving the compressor. In the compressor control system, a rotation speed of the compressor electric motor is controlled by the driving electronic control unit.

Accordingly, when a hybrid vehicle or an electric vehicle is manufactured based on an engine vehicle, an output circuit for outputting a driving signal for the compressor electric motor only needs to be newly provided in the driving electronic control unit. Generally, when the hybrid vehicle or the electric vehicle is manufactured based on the engine vehicle, the driving electronic control unit needs to be newly provided. Therefore, a cost does not increase significantly even if the output circuit is provided in the driving electronic control unit that needs to be newly designed and manufactured. Furthermore, the output circuit does not need to be provided in the air-conditioning electronic control unit of the engine vehicle. Accordingly, the air-conditioning electronic control unit of the engine vehicle can be directly applied to an air-conditioning electronic control unit of the hybrid vehicle or the electric vehicle without a substantial hardware design change. Thus, when the hybrid vehicle or the electric vehicle is manufactured based on the engine vehicle or when the engine vehicle is manufactured based on the hybrid vehicle or the electric vehicle, because the substantial hardware design change of the air-conditioning electronic control unit can be avoided, the cost of the vehicle can be effectively reduced.

Preferably, the compressor control system includes the air-conditioning electronic control unit to which an air-conditioning signal relevant to the air-conditioning is inputted. In this case, the air-conditioning electronic control unit controls operation of the air conditioner based on the air-conditioning signal, and the air-conditioning electronic control unit is provided to communicate with the driving electronic control unit. More preferably, the air-conditioning electronic control unit communicates with the driving electronic control unit through a local area network of the vehicle.

For example, the air-conditioning electronic control unit calculates a target rotation speed of the compressor electric motor based on the air-conditioning signal and outputs a signal representing the target rotation speed to the driving electronic control unit, and the driving electronic control unit controls the rotation speed of the compressor electric motor based on the signal representing the target rotation speed. In this case, the rotation speed of the compressor can be accurately controlled.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
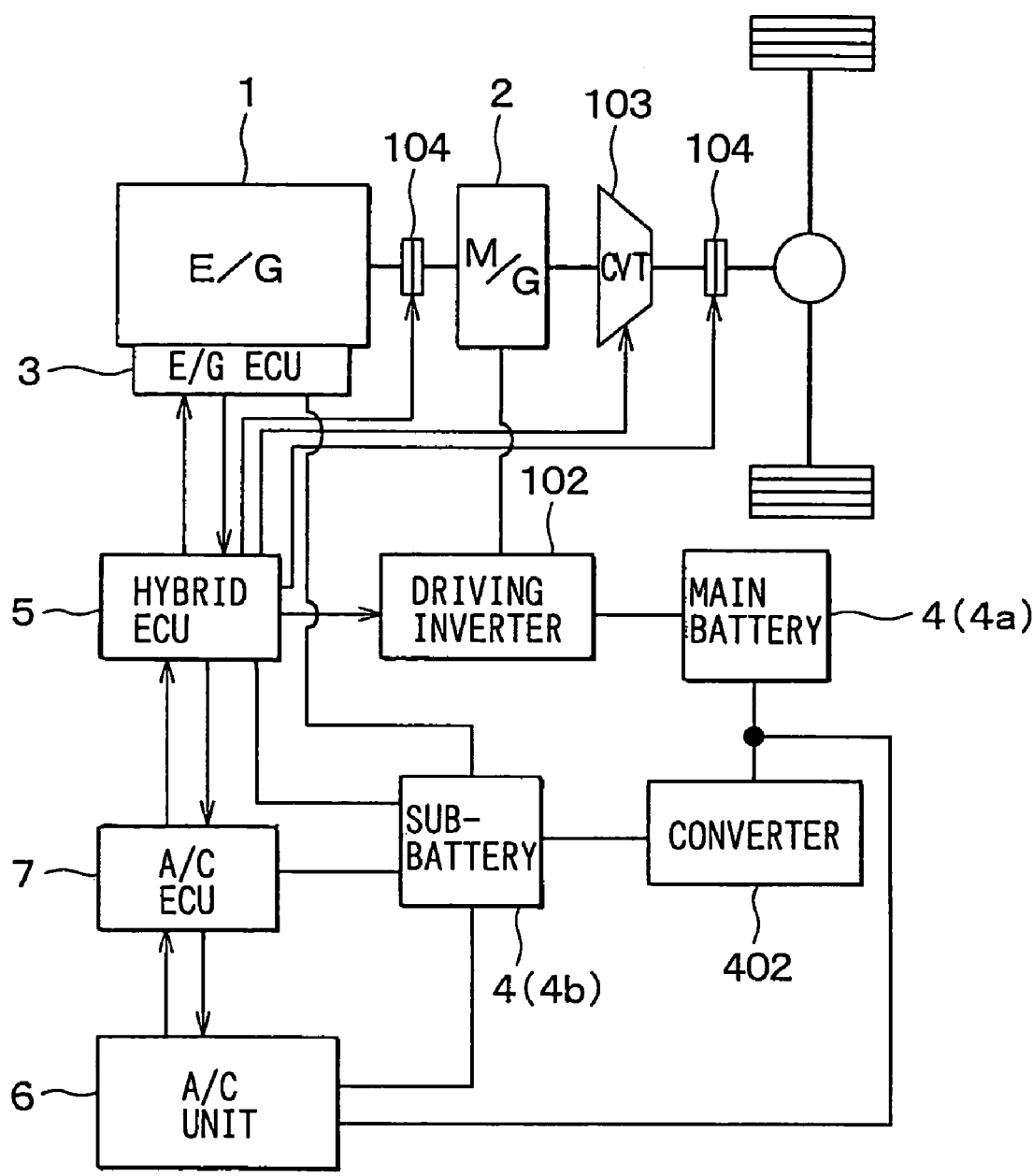
FIG. 1 is a schematic diagram showing an entire structure of a hybrid vehicle on which an air conditioner according to a preferred embodiment of the present invention is mounted.

In this embodiment, a compressor control system of the present invention is typically applied to a hybrid vehicle. As shown in FIG. 1, the hybrid vehicle includes an engine 1, an electric motor generator 2, an engine electronic control unit (ECU) 3, a battery 4 and a hybrid ECU (driving ECU) 5. Here, the engine 1 is an internal combustion system for generating motive power by exploding and burning liquid fuel such as gasoline. The electric motor generator 2 is a motor generator which includes a motor function for an auxiliary driving of the vehicle, and a generator function.

The engine ECU 3 controls an amount of fuel supplied to the engine 1 and an ignition timing, etc. The battery 4 is a secondary battery which supplies electric power to the electric motor generator 2 and the engine ECU 3, etc. The hybrid ECU 5 performs a control of the electric motor generator 2 (e.g., inverter control) and a control of a continuously variable transmission 103 and a clutch 104. Furthermore, the hybrid ECU 5 outputs a control signal (e.g., target values of rotation speed and torque in the engine 1) to the engine ECU 3.

The electric motor generator 2 acts as an electric motor for generating motive power when electric power is supplied from the battery 4. To the contrary, the electric motor generator 2 acts as a generator for generating electric power when it is driven by the engine 1. In the embodiment, the battery 4 is a nickel-hydrogen storage battery and is composed of a main battery 4a with a high voltage (e.g., 288 V) and a sub-battery 4b with a low voltage (e.g., 12 V).

The engine ECU 3 suitably controls the amount of fuel supplied to the engine 1, an ignition timing and the like based on a control signal from the hybrid ECU 5, so that the rotation speed of the engine 1 and the torque thereof can be controlled at target values, and high fuel-combustion efficiency can be obtained in the engine 1.

The hybrid ECU 5 has a function for controlling a drive switching, that is, a function for determining which of the electric motor generator 2 and the engine 1 is used to transmit a driving force to driving wheels of the vehicle. In addition, the hybrid ECU 5 has a function for controlling charge and discharge of the main battery 4a.

Specifically, the following control is basically performed by the hybrid ECU 5.

First, when the vehicle is stopped, that is, when a vehicle speed is about 0 km/h, the engine 1 is stopped.

When the vehicle runs, a driving force generated in the engine 1 is transmitted to the driving wheels, except for in a case where the vehicle is in a deceleration state. In the deceleration state of the vehicle, the engine 1 is stopped, and the battery 4 is charged by generating electric power in the electric motor generator 2.

When a running load is large such as in a case where the vehicle starts running, the vehicle is accelerated, the vehicle is going up in a slope, or the vehicle runs at high speed, the electric motor generator 2 is used as the electric motor, so that driving force generated in the electric motor generator 2 is also transmitted to the driving wheels in addition to the driving force generated in the engine 1. In the embodiment, the running load can be calculated based on a vehicle speed and a pedaled amount of an acceleration pedal.

When a residual charging degree of the main battery 4a is equal to or lower than a target value for starting the charging of the battery 4 while the vehicle is running, the motive power from the engine 1 is transmitted to the electric motor generator 2, so that the battery 4 is charged by operating the electric motor generator 2 as the generator.

Further, when the residual charging degree of the battery 4 is equal to or lower than the target value for starting the charging of the battery 4 while the vehicle is stopped, a signal for starting the engine 1 is sent to the engine ECU 3. Therefore, the engine 1 is driven, and the motive power is transmitted to the electric motor generator 2.

In this embodiment, the target value for starting the charging of the battery 4 is a threshold value of the residual charging degree for starting the charging, and is indicated by percentage when a full charging degree is 100.

A driving inverter 102 is a frequency transformer for changing a frequency of voltage or current of electric power between the electric motor generator 2 and the main battery 4a. A DC/DC converter 402 is a transformer for changing voltage of electric power between the main battery 4a and the sub-battery 4b. Further, the continuously variable transmission 103 is disposed for changing a speed reduction ratio of the driving force generated in the engine 1 and the electric motor generator 2. The clutch 104 is disposed to interrupt the transmission of the driving force.

The air conditioner includes an air conditioning unit 6 for performing air-conditioning in a passenger compartment of the vehicle and an air-conditioning ECU 7 for controlling components of the air conditioning unit 6. In the embodiment, the air conditioner is an automatic-controlled air conditioner where the temperature in the passenger compartment is automatically controlled at a temperature set arbitrarily.

Figure 2:
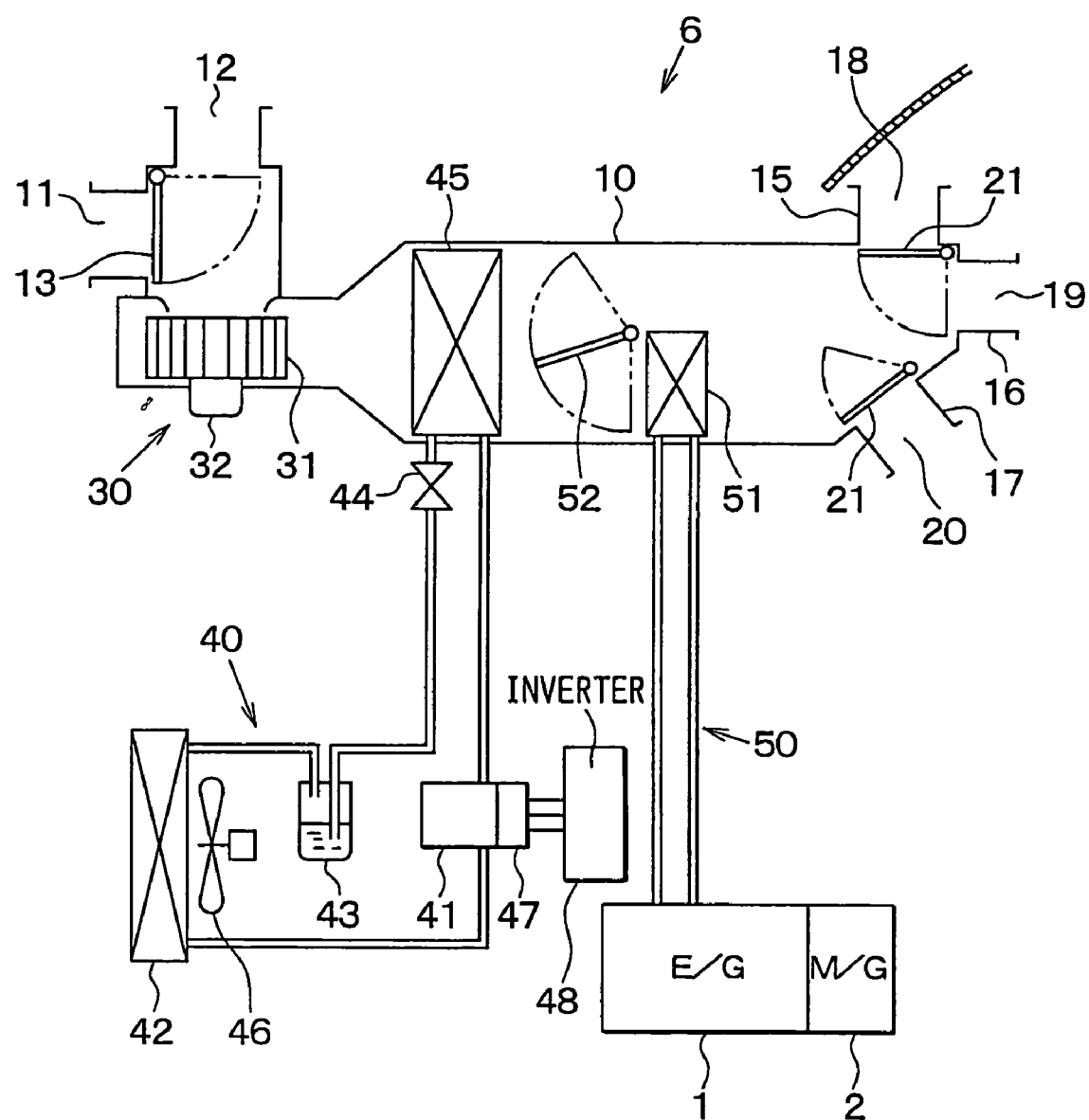
FIG. 2 is a schematic diagram showing an entire structure of the air conditioner according to the embodiment.

The air conditioning unit 6 has an air-conditioning duct 10 is disposed in the passenger compartment at a front side. As shown in FIG. 2, the air conditioning unit 6 includes the air-conditioning duct 10 for defining an air passage through which air is introduced into the passenger compartment, a centrifugal type blower 30 for blowing air in the air-conditioning duct 10, a refrigerant cycle system 40, a cooling water circuit 50, etc. The refrigerant cycle system 40 is disposed to cool air flowing through the air-conditioning duct 10.

Figure 3:
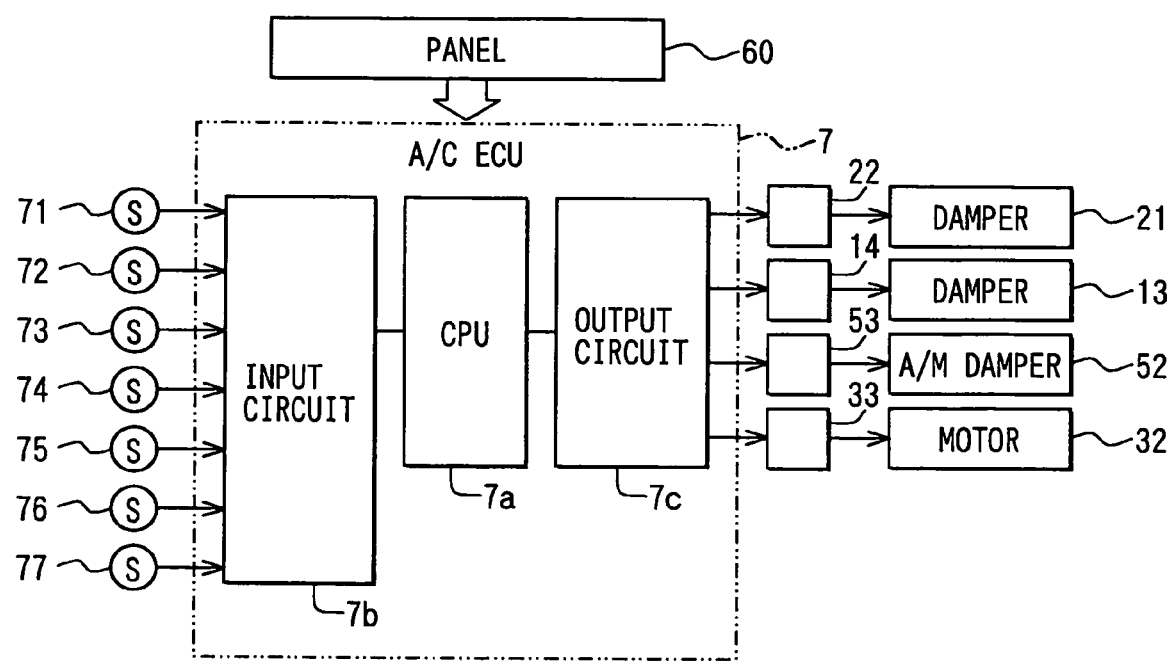
FIG. 3 is a block diagram showing a control system of the air conditioner according to the embodiment.

An inside/outside air switching box, disposed at the most upstream air side of the air-conditioning duct 10, includes an inside air suction port 11 from which inside air inside the passenger compartment is introduced, and an outside air suction port 12 from which outside air outside the passenger compartment is introduced. These suction ports 11, 12 are opened and closed by an inside/outside air switching damper 13, and the inside/outside air switching damper 13 is driven by an actuator 14 such as a servomotor (FIG. 3).

At the most downstream air side of the air-conditioning duct 10, a defroster opening portion, a face opening portion and a foot opening portion are provided. A defroster duct 15 is connected to the defroster opening portion, and a defroster air outlet port 18, from which conditioned air is blown toward an inner surface of a vehicle windshield, is provided at the most downstream air end of the defroster duct 15.

A face duct 16 is connected to the face opening portion, and a face air outlet port 19, from which conditioned air is blown toward the upper half body of a passenger, is provided at the most downstream air end of the face duct 16. A foot duct 17 is connected to the foot opening portion, and a foot air outlet port 20, from which conditioned air is blown to the foot portion of the passenger, is provided at the most downstream air end of the foot duct 17.

Two switching dampers 21, driven by actuators 22 (FIG. 3) respectively, are rotatably provided for opening and closing the air outlet ports 18–20. Thus, the switching dampers 21 can switch one air-outlet mode among a face mode, a bi-level mode, a foot mode, a foot/defroster mode and a defroster mode.

The blower 30 includes a centrifugal fan 31 rotatably disposed in a scroll case integrated with the air-conditioning duct 10, and a blower motor 32 for driving the centrifugal fan 31. A blown air amount (rotation speed of the centrifugal fan 31) is controlled in accordance with blower voltage applied to the blower motor 32 through a blower driving circuit 33.

The refrigerant cycle system 40 includes an electric compressor 41, a condenser 42, a gas-liquid separator 43, an expansion valve 44, an evaporator 45, a cooling fan 46 for blowing outside air to the condenser 42, refrigerant piping for connecting these, and the like.

The electric compressor 41 includes a motor for driving a compression mechanism using an electric power from the battery 4. The condenser 42 is disposed to cool and condense refrigerant by performing a heat exchange between compressed refrigerant and outside air. The gas-liquid separator 43 is disposed to separate the condensed refrigerant from the condenser 42 into gas refrigerant and liquid refrigerant, so that only the liquid refrigerant flows to a downstream refrigerant side. The expansion valve 44 decompresses and expands the liquid refrigerant from the gas-liquid separator 43, and the evaporator 45 is disposed to perform a heat exchange between the decompressed refrigerant from the expansion valve 44 and air passing through the air-conditioning duct 10. An alternating-current (AC) voltage is applied to the compressor electric motor 47 of the electric compressor 41 through a compressor inverter 48, and the compressor inverter 48 adjusts a frequency of the AC voltage based on an instruction from the air-conditioning ECU 7. Thus, a rotation speed of the electric compressor 41 can be continuously changed. A system for controlling the rotation speed will be described later.

A heater core 51 is disposed in the cooling water circuit 50 in which engine-cooling water (hot water) of the engine 1 is circulated by a water pump (not shown). The heater core 51 performs a heat exchange between the engine-cooling water and air so that air passing through the heater core 51 is heated.

The heater core 51 is disposed in the air-conditioning duct 10 at a downstream air side of the evaporator 45 so as to partly cross the air passage in the air-conditioning duct 10. An air mixing damper 52, driven by an actuator 53 (FIG. 3) such as a servomotor, is rotatably disposed at an upstream air side of the heater core 51. The air mixing damper 52 adjusts a ratio of an air amount passing through the heater core 51 and an air amount bypassing the heater core 51, so as to adjust a temperature of air to be blown into the passenger compartment.

Next, a control system for the air conditioner according to the embodiment will be described with reference to FIGS. 1, 3 and 4. The air-conditioning ECU 7, the hybrid ECU 5 and the engine ECU 3 can communicate with each other. In this embodiment, the ECUs 3, 5, 7 are connected to each other through a vehicle local area network (LAN) so that they can communicate with each other.

Into the air-conditioning ECU 7, communication signals from the hybrid ECU 5, switch signals from multiple switches provided on a control panel 60 at a front side of the passenger compartment, and sensor signals from multiple sensors are inputted.

The multiple switches provided on the control panel 60 include an air-conditioning switch, a suction-port changing over switch, a temperature setting lever, an air amount changing over switch, an air-outlet mode changing over switch and the like. The air-conditioning switch is disposed to start and stop operation of the refrigerant cycle system 40, that is, the electric compressor 41. The suction-port changing over switch selects an air-suction mode, and the temperature setting lever sets a temperature in the passenger compartment at a requested temperature. The air-amount changing over switch selects an amount of air blown by the centrifugal fan 31, and the air-outlet mode changing over switch selects an air-outlet mode.

The air-outlet mode changing over switch includes a face switch for setting a face mode, a bi-level switch for setting a bi-level mode, a foot switch for setting a foot mode, a foot/defroster switch for setting a foot/defroster mode and a defroster switch for setting a defroster mode.

As shown in FIG. 3, the multiple sensors include an inside air temperature sensor 71, an outside air temperature sensor 72, a solar radiation sensor 73, an evaporator suction air temperature sensor 74, an evaporator air-blown temperature sensor 75, a water temperature sensor 76, a vehicle speed sensor 77 and the like. The inside air temperature sensor 71 detects an air temperature in the passenger compartment, and the outside air temperature sensor 72 detects an air temperature outside the passenger compartment. The solar radiation sensor 73 detects an amount of sunlight radiated into the passenger compartment. The evaporator suction air temperature sensor 74 detects a temperature (evaporator suction temperature) of air flowing into the evaporator 45. The evaporator air-blown temperature sensor 75 detects a temperature of air immediately after flowing through the evaporator 45. The water temperature sensor 76 detects a temperature of the cooling water flowing into the heater core 51, and the vehicle speed sensor 77 detects a vehicle speed. Among the above sensors, thermistors are used as the inside air temperature sensor 71, the outside air temperature sensor 72, the evaporator suction air temperature sensor 74, the evaporator air-blown temperature sensor 75 and the water temperature sensor 76.

The air-conditioning ECU 7 includes a microcomputer 7a composed of devices (not shown) such as a central processing unit (CPU), a read only memory (ROM) and a random access memory (RAM). The sensor signals from the sensors 71–77 are processed (e.g., analog-digital conversion) by an input circuit 7b within the air-conditioning ECU 7. Thereafter, the processed signals are inputted to the microcomputer 7a.

Control signals outputted from the microcomputer 7a are processed (e.g., digital-analog conversion, amplification) and the processed signals are outputted through an output circuit 107c' to the actuators 14, 22, 53, and the blower driving circuit 33 as driving signals. The air-conditioning ECU 7 is operated by being supplied with a direct-current (DC) power source from the sub-battery 4b when an ignition switch is turned on.

Next, control processes of the air-conditioning ECU 7 will be described with reference to FIGS. 4 and 5. When the ignition switch is turned on, the DC power source is supplied to the air-conditioning ECU 7 and a control routine shown in FIG. 4 is started.

First, initial setting is performed at step S1. Next, at step S2, the air-conditioning ECU 7 reads the switch signals from the switches such as the temperature setting lever. At step S3, the air-conditioning ECU 7 reads signals to which the sensor signals from the inside air temperature sensor 71, the outside air temperature sensor 72, the solar radiation sensor 73, the evaporator suction air temperature sensor 74, the evaporator air-blown temperature sensor 75, the water temperature sensor 76 and the vehicle speed sensor 77 are converted by the analog-digital conversion. At step S4, a target temperature TAO of air to be blown into the passenger compartment is calculated based on the following formula (1) beforehand stored in the ROM.

$$TAO = Kset \times Tset - KR \times TR - KAM \times TAM - KS \times TS + C \qquad (1)$$

Wherein, Tset indicates a temperature set by the temperature setting lever, TR indicates an inside air temperature detected by the inside air temperature sensor 71, TAM indicates an outside air temperature detected by the outside air temperature sensor 72, and TS indicates a solar radiation amount detected by the solar radiation sensor 73. Kset, KR, KAM and KS indicate gain coefficients respectively, and C indicates a correction constant.

At step S5, a blower voltage (applied to the blower motor 32) corresponding to the target air temperature TAO is determined using a characteristic graph beforehand stored in the ROM. Specifically, as the target air temperature TAO becomes lower than the set temperature or higher than that, the blower voltage is made higher (air blowing amount is increased). To the contrary, as the target air temperature TAO becomes close to the set temperature, the blower voltage is made lower.

Next, at step S6, an air-suction mode corresponding to the target air temperature TAO is determined using a characteristic graph beforehand stored in the ROM. Specifically, when the target air temperature TAO is high, an inside air circulation mode is selected. When the target air temperature TAO is low, an outside air introduction mode is selected.

At step S7, an air-outlet mode corresponding to the target air temperature TAO is determined using a characteristic graph beforehand stored in the ROM. Specifically, when the target air temperature TAO is low, the foot mode is selected. As the target air temperature TAO becomes higher, the air-outlet mode is selected from the foot mode to the face mode through the bi-level mode.

At step S8, an open degree of the air mixing damper 52 is determined in accordance with the target air temperature TAO, the evaporator air temperature detected by the evaporator air-blown temperature sensor 75, the cooling water temperature detected by the water temperature sensor 76 and the like.

Figure 5:
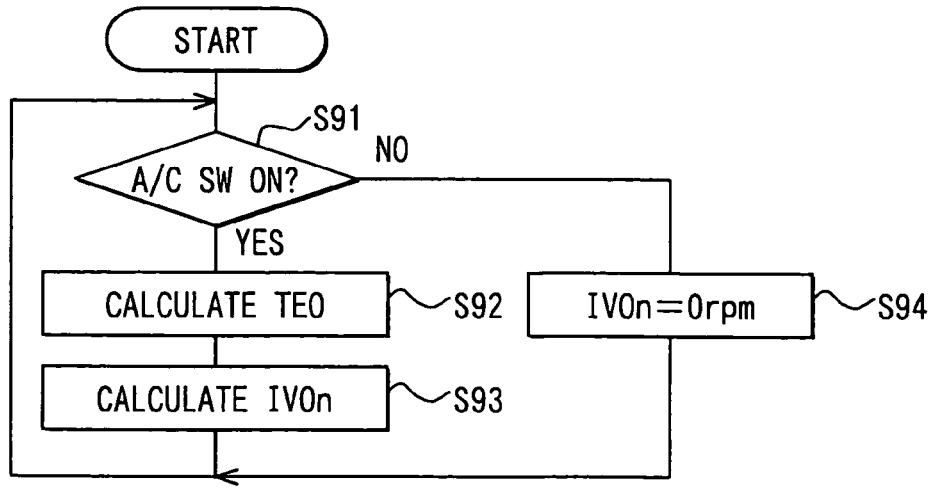
FIG. 5 is a flow diagram showing a subroutine control of the basic control processes shown in FIG. 4.

At step S9, a sub-routine shown in FIG. 5 is called, and the rotation speed of the electric compressor 41 is determined when the air-conditioning switch is turned on.

At step S10, control signals are outputted to the actuators 14, 22, 53, the blower driving circuit 33 and the hybrid ECU 5 so as to obtain each of control states calculated or determined at steps S4–S9. Further, the control signals to the actuators 14, 22, 53 and the blower driving circuit 33 are outputted by the output circuit 7c and the control signal to the hybrid ECU 5 is outputted by the vehicle LAN.

Next, operation of the air conditioner will be now described. While air blown by the blower 30 in the air-conditioning duct 10 flows through the evaporator 45 in the refrigerant cycle system 40, air is heat-exchanged with refrigerant and is cooled. Here, the rotation speed of the electric compressor 41 is controlled by the air-conditioning ECU 7, so that an amount of refrigerant, flowing in the refrigerant cycle system 40, is controlled and the cooling performance of the refrigerant cycle system 40 is adjusted.

When air cooled in the evaporator 45 flows through the heater core 51 in the cooling water circuit 50, air is heat-exchanged with the engine-cooling water and is heated. In addition, the flow ratio of air flowing through the heater core 51 and air bypassing the heater core 51 is adjusted by an operation position of the air mixing damper 52. Thus, the conditioned air adjusted at a predetermined temperature is blown from one or two of the air outlet ports 18-20 into the passenger compartment.

Next, detail control of the rotation speed of the electric compressor 41 will be now described with reference to FIG. 5.

When the air-conditioning switch is turned on at step S91, the air-conditioning ECU 7 calculates a target evaporator air temperature TEO based on the signals inputted from the sensors 71–77 at step S92. At steps S93 or S94, a target rotation speed IVOn of the compressor 41 is calculated based on the target evaporator air temperature TEO. At step S10 in FIG. 4, the signal representing the calculated target rotation speed IVOn of the compressor 41 is inputted to the hybrid ECU 5 thorough the vehicle LAN.

Specifically, the target rotation speed IVOn is calculated as follows. First, at step S91, it is determined whether the air-conditioning switch is turned ON. When the air-conditioning switch is ON, the target evaporator air temperature TEO is calculated based on the target air temperature TAO and the outside air temperature TAM at step S92.

Next, a difference $E_n$ between the target evaporator air temperature TEO and an evaporator air temperature TE detected by the evaporator air-blown temperature sensor 75 and a difference change rate Edot are calculated based on the following formulas (2) and (3).

$$E_n = TEO - TE \quad (2)$$

$$Edot = E_n - E_{n-1} \quad (3)$$

Wherein, $E_{n-1}$ indicates a value of the difference at previous time. Because the difference $E_n$ is calculated every 4 seconds, the difference $E_{n-1}$ at the previous time is a value which is calculated 4 seconds prior to the present time where the difference $E_n$ is calculated.

Next, a target incremental rotation speed Δf (rpm) at the difference $E_n$ and the difference change rate Edot is calculated based on a predetermined membership function and a rule stored in the ROM. The target incremental rotation speed Δf is an increment of the rotation speed of the compressor 41 from the target rotation speed $IVO_{n-1}$ at the previous time, before 4 seconds from the present time where the target rotation speed IVOn is calculated.

Figure 4:
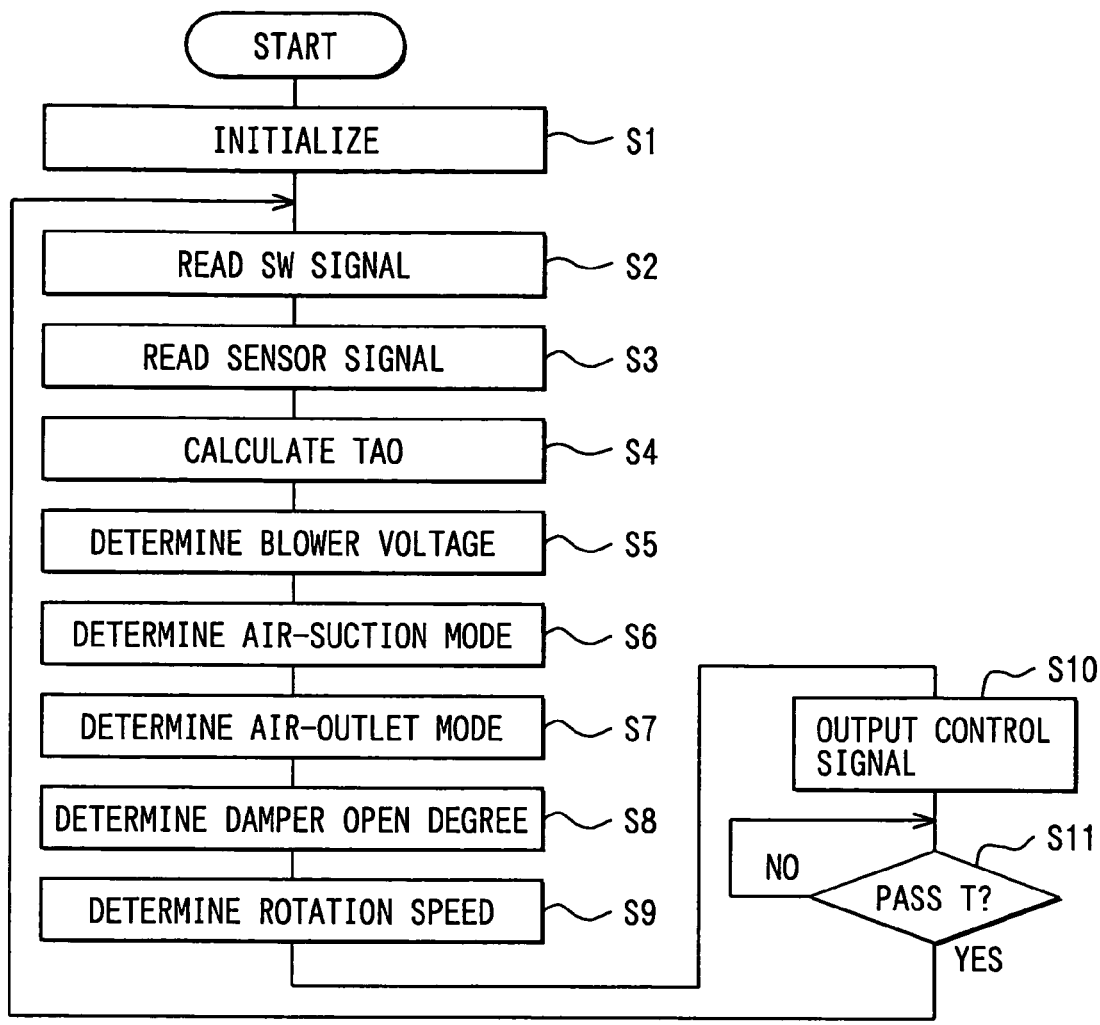
FIG. 4 is a flow diagram showing basic control processes of an air-conditioning ECU shown in FIG. 3.

After the target rotation speed IVOn is determined at step S93 as described above, the control routine proceeds to step S10 in FIG. 4. At step S10, a signal representing the target rotation speed IVOn of the compressor 41 is outputted to the hybrid ECU 5. Then, the hybrid ECU 5 controls the compressor inverter 48 so that the rotation speed of the compressor 41 approximates to the target rotation speed IVOn. Thus, the evaporator air temperature TE approximates to the target evaporator air temperature TEO by the control operation of the compressor inverter 48.

Further, when it is determined that the air-conditioning switch is turned OFF at step S91, the target rotation speed IVOn is set to 0 rpm at step S94 and the compressor 41 is stopped. Then, the control routine returns to step S2 in FIG. 4 after a predetermined time T passes at step S111 in FIG. 4.

Figure 6:
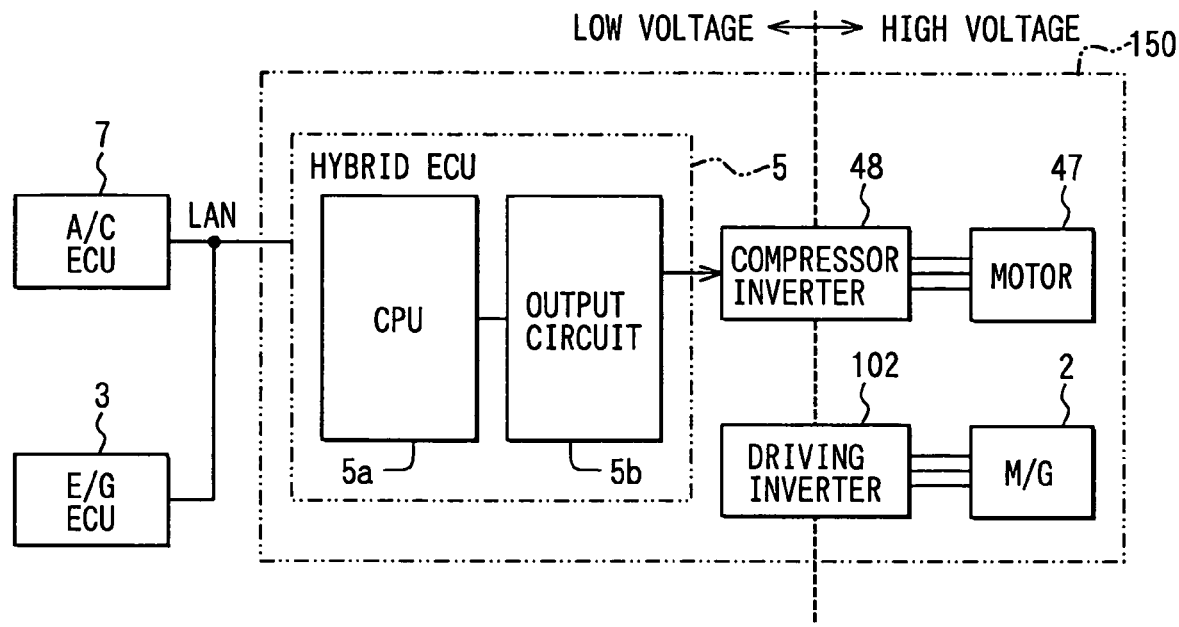
FIG. 6 is a block diagram showing a structure of the control system for controlling operation of a compressor in FIG. 2.

Here, in FIG. 6, the air-conditioning ECU 7 and the hybrid ECU 5 can communicate with each other by using the vehicle LAN, and the hybrid ECU 5 can communicate with the inverters 48, 102 by using a communication method such as serial communication.

Figure 7:
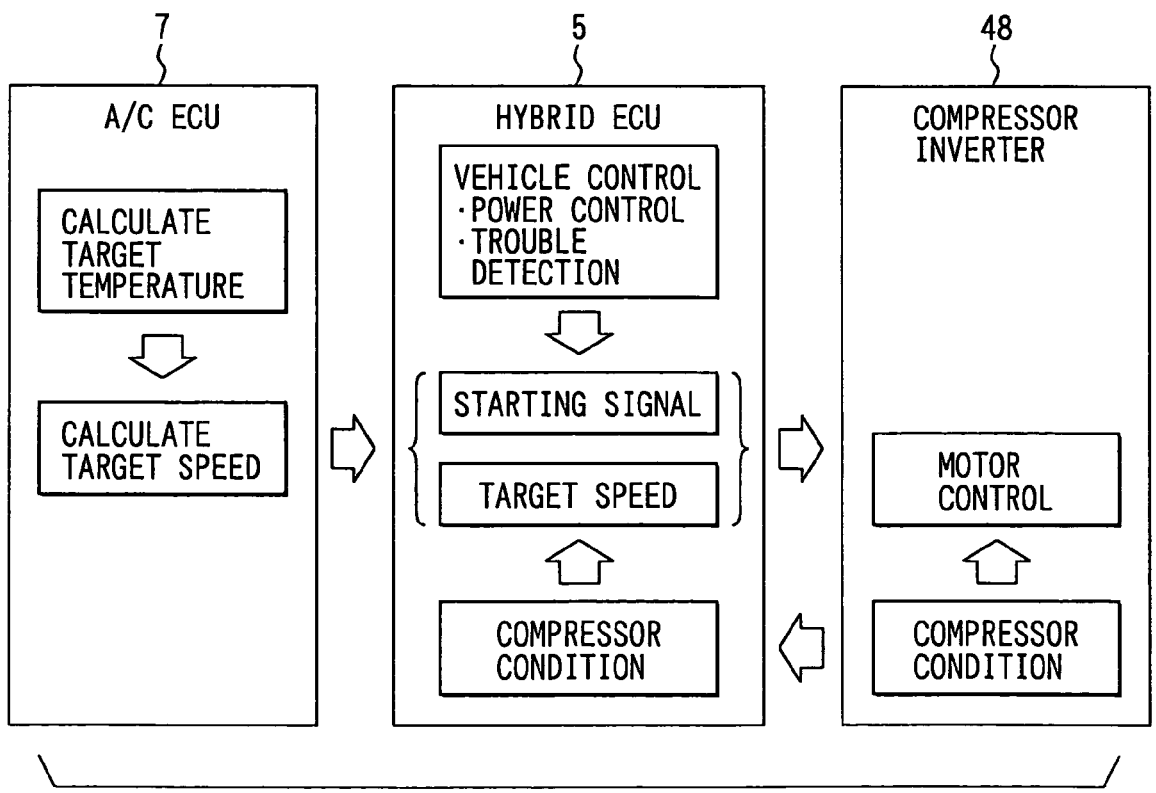
FIG. 7 is a schematic diagram showing a control flow of the compressor among the air-conditioning ECU, a hybrid ECU and a compressor inverter in FIG. 6.

In FIG. 7, the hybrid ECU 5 converts the signal representing the target rotation speed IVOn, which is inputted from the air-conditioning ECU 7, and an inverter starting signal to a driving signal which can be processed by the compressor inverter 48 in an output circuit 5b in FIG. 6. The converted driving signal is outputted to the compressor inverter 48. In addition, the hybrid ECU 5 includes an output circuit 5b which converts a signal to a driving signal which can be processed by the driving inverter 102 and outputs the converted driving signal to the driving inverter 102.

The hybrid ECU 5 includes a determining means for determining whether the vehicle is in a condition where the rotation speed of the compressor 41 should be restricted. The condition to be restricted is, for example, an overloading state of running load (acceleration cut), an over-discharging state of the battery 4 and troubles caused by faults of vehicle components.

A signal representing the operating condition of the compressor inverter 48 or the compressor electric motor 47 is inputted to the hybrid ECU 5 as a feedback signal. In addition, the hybrid ECU 5 includes a determining means for determining whether the operating condition is a condition where the rotation speed of the compressor 41 should be restricted. The condition to be restricted is, for example, troubles detected by a self-diagnosis function of the compressor inverter 48, troubles caused by temperature rise of an IGBT module and an excessive power-consumption state of the compressor electric motor 47.

When it is determined that the above conditions should be restricted, the target rotation speed IVOn is reduced or the compressor 41 is stopped by prohibiting output of the inverter starting signal.

The above feedback signal includes a signal representing an actual rotation speed of the compressor 41. The signal representing the actual rotation speed is outputted to the air-conditioning ECU 7 through the hybrid ECU 5. Therefore, the air-conditioning ECU 7 can calculate the target rotation speed IVOn based on the inputted signal representing the actual rotation speed.

Figure 8:
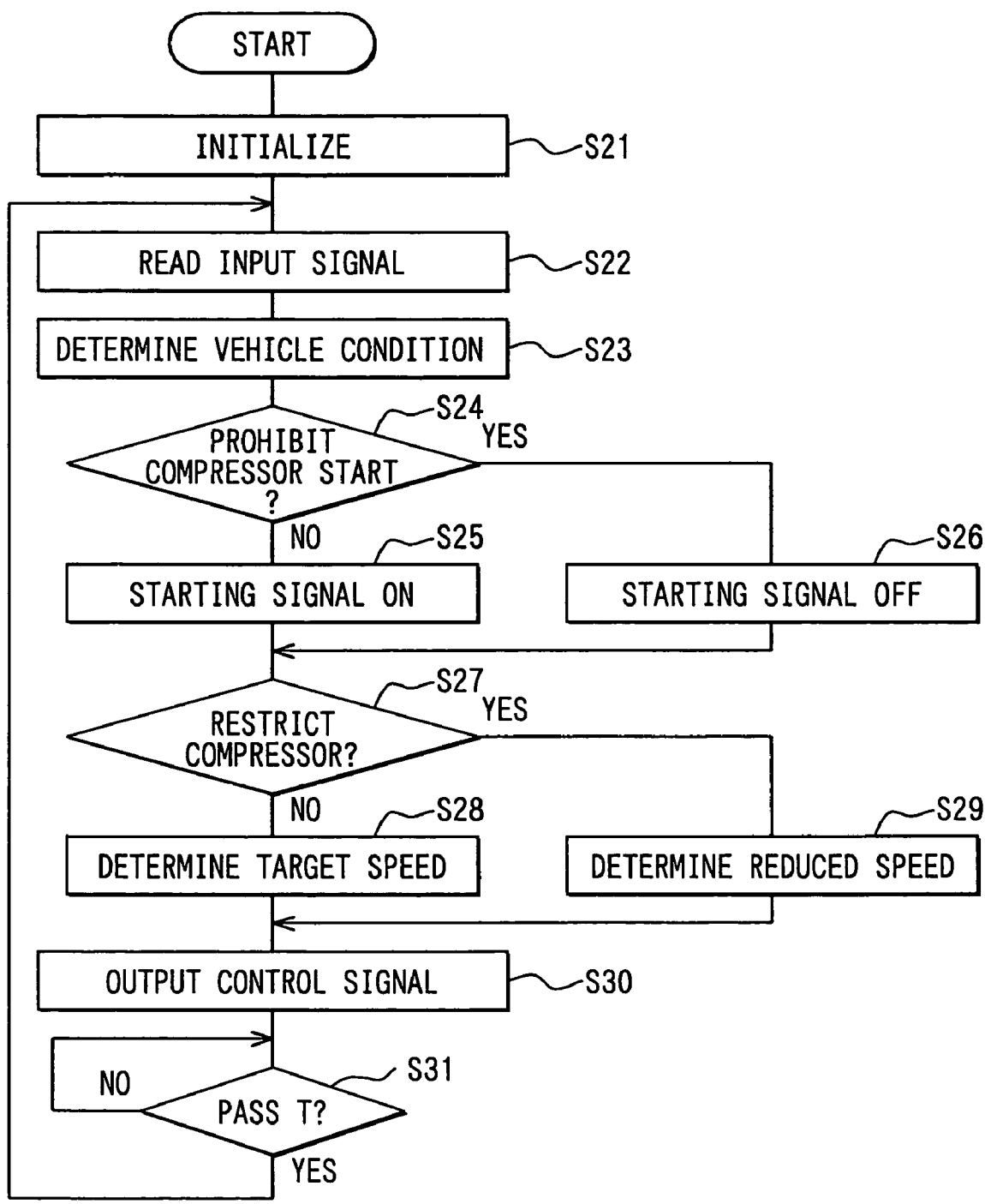
FIG. 8 is a flow diagram showing control processes of the hybrid ECU in FIG. 7.

Next, the control processes related to the air-conditioning control in the hybrid ECU 5 will be now described with reference to FIG. 8.

Within the hybrid ECU 5, a microcomputer 5a (FIG. 6) composed of devices (not shown) such as a CPU, a ROM, a RAM and the like is provided. The sensor signal from the vehicle speed sensor 77 is converted from an analog signal to a digital signal by an input circuit (not shown) within the hybrid ECU 5. Thereafter, the digital signal is inputted to the microcomputer 5a. In addition, the hybrid ECU 5 includes the output circuit 5b which converts a signal outputted from the microcomputer 5a to the driving signal which can be processed by the inverters 48, 102 and outputs the converted driving signal.

First, when the ignition switch is turned on, the DC power source from the buttery 4 is supplied to the hybrid ECU 5. Next, a control routine shown in FIG. 8 is started and initial setting is performed at step S21. Then, the signal representing the target rotation speed IVOn is read from the air-conditioning ECU 7 at step S22.

Next, at step S23, it is determined that the vehicle condition such as the overloading state of running load (acceleration cut), the over-discharging state of the battery 4, the troubles caused by faults of vehicle components. Then, at step S24, it is determined whether the vehicle is in a condition where the starting of the compressor 41 needs to be prohibited. When it is determined that the starting of the compressor 41 needs not to be prohibited, the inverter starting signal is set to ON at step S25. When it is determined to be prohibited at step S24, the inverter starting signal is set to OFF at step S26.

Further, at step S27, it is determined whether the vehicle is in the condition where the rotation speed of the compressor 41 needs to be restricted. When it is determined not to be restricted at step S27, a rotation speed requested by the air-conditioning ECU 7, that is, the target rotation speed IVOn is determined as the target rotation speed at step S28. When it is determined to be restricted at step S27, the target rotation speed IVOn is reduced and the reduced value is determined as the target rotation speed at step S29.

At step S30, the determined target rotation speed IVOn and the inverter starting signal are outputted to the compressor inverter 48 as the driving signals. Then, the process returns to step S22 after a predetermined time T passes at step S31.

The hybrid ECU 5 outputs the target rotation speed IVOn to the inverters 48, 102. The inverters 48, 102 include an IGBT module which has switching transistors corresponding to each phase winding of the electric motors (three-phase AC motors) 47, 2. The IGBT module is driven based on the outputted signal from the hybrid ECU 5.

Further, within the inverters 48, 102, a low-voltage (e.g., 12V) circuit and a high-voltage (e.g., 288V) circuit are provided. These circuits are insulated each other and connected through a photo-coupler. The driving signal from the hybrid ECU 5 is inputted to the low-voltage circuit. Then, the driving signal is inputted to a microcomputer, which controls operation of the IGBT module disposed in the high-voltage circuit through the photo-coupler.

Accordingly, a communication speed between the hybrid ECU 5, which inputs the driving signal to the low-voltage circuit, and the microcomputers of the inverters 48, 102 is very low. Therefore, the vehicle LAN, which is high-speed communication, can not be used for the communication between the hybrid ECU 5 and the inverters 48, 102. Lower-speed communication means having a low-speed communication compared with the vehicle LAN, such as the above serial communication and parallel communication, is preferable for the communication between the inverters 48, 102 and the hybrid ECU 5.

Next, the control processes of the compressor inverter 48 will be now described with reference to FIG. 9.

Figure 9:
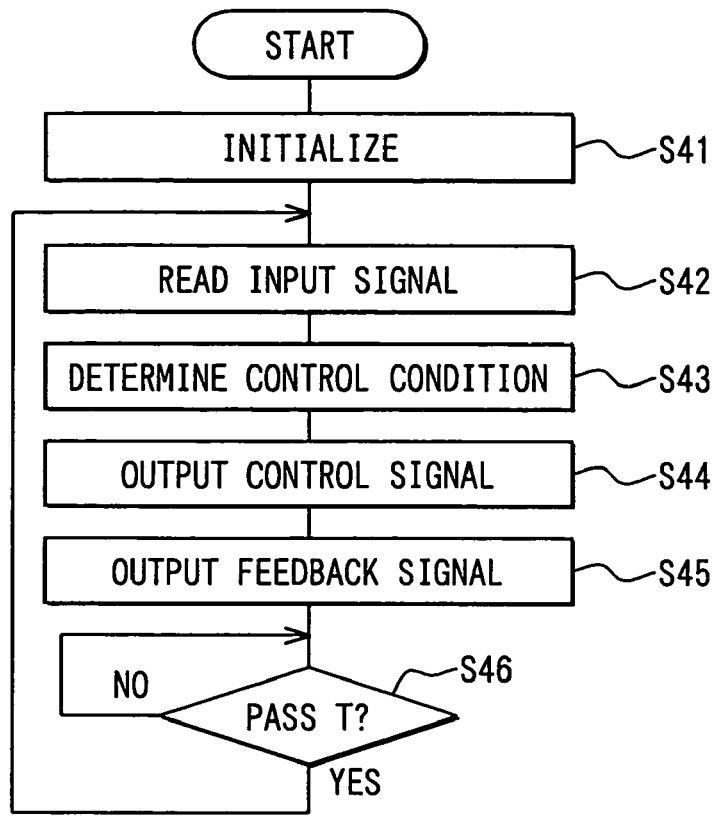
FIG. 9 is a flow diagram showing control processes of the compressor inverter in FIG. 7.

When the ignition switch is turned on and the DC power source is supplied to the microcomputer of the compressor inverter 48 from the battery 4, the control routine in FIG. 9 is started. At step S41, initial setting is performed. Then, the inverter starting signal and the signal representing the target rotation speed IVOn are read from the hybrid ECU 5 at step S42.

Next, the above operation condition, such as the troubles detected by the self-diagnosis function of the compressor inverter 48, the troubles caused by a temperature rise of the IGBT module and the excessive power-consumption of the compressor electric motor 47, is determined at step S43. The signal for controlling the compressor electric motor 47 is outputted to the IGBT module at step S44.

Here, an example of the above excessive power-consumption of the compressor electric motor 47 will be explained. Actual power consumption of the driving electric motor 2 is detected in order to control the vehicle driving condition. In this case, the driving electric motor 2 may consume electric power more than a permissible electric power of the vehicle. That is, the excessive power-consumption may occur. In this case, the operation of the compressor electric motor 47 needs to be restricted.

Next, the feedback signal, which represents the compressor operating condition such as the actual rotation speed of the compressor 41, is outputted to the hybrid ECU 5 at step S45. Then, the process returns to step S42 after a predetermined time T passes at step S46.

Here, the operation and effect of the air conditioner according to the embodiment will be described. In some cases, the hybrid vehicle according to the embodiment is manufactured based on the engine vehicle in FIG. 11B. In this case, existing parts of the engine vehicle are used as much as possible in order to reduce design cost.

In this embodiment, the output circuit 5b is provided in the hybrid ECU 5 in order to output the driving signal for driving the compressor electric motor 47. The output circuit 5b for outputting the driving signal for driving the compressor electric motor 47 does not need to be provided in the air-conditioning ECU 7 which is an existing device in the engine vehicle. That is, the air-conditioning ECU 7 of the engine vehicle can be directly applied to the hybrid vehicle without a hardware change. Therefore, design cost can be reduced.

When the hybrid vehicle is manufactured based on the engine vehicle as described above, the components 150 surrounded by a dot-dash line in FIG. 6 are newly provided. That is, the hybrid ECU 5 is also newly provided. Therefore, a high cost is not caused by providing the output circuit 5b in the hybrid ECU 5, which should be newly designed and manufactured.

Figure 10:
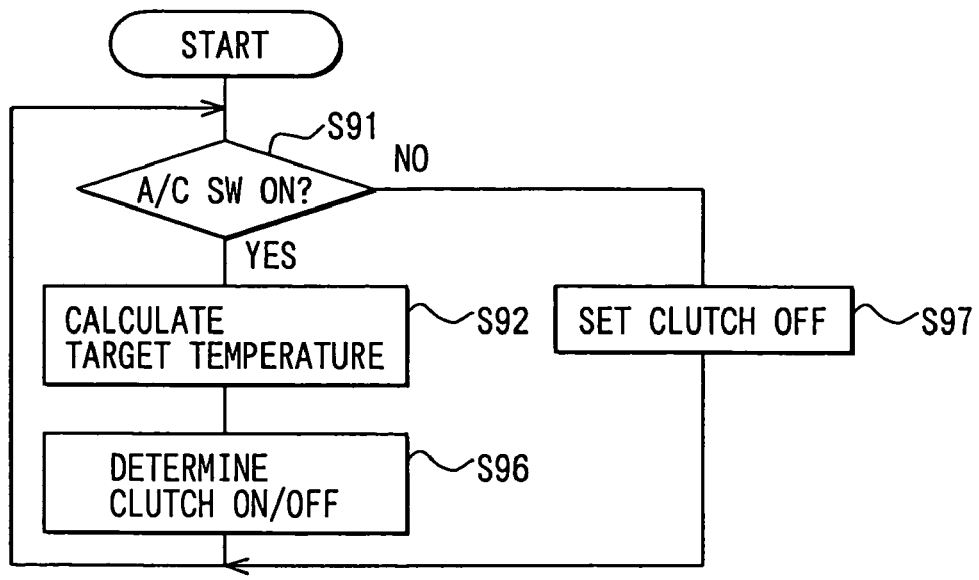
FIG. 10 is a flow diagram showing control processes when the subroutine control in FIG. 5 is modified for a subroutine control of an engine vehicle.

To the contrary, a software change is required when the air-conditioning ECU 7, which is the existing device of the engine vehicle, is directly applied to the hybrid vehicle. However, a software for controlling the compartment units 14, 22, 33, 53 is the same with that of the air-conditioning ECU 7 of the engine vehicle. Therefore, by only changing subroutine program in FIG. 10 to the subroutine program in FIG. 5, the air-conditioning ECU 7, which is the existing device of the engine vehicle, can be applied to the hybrid vehicle without a hardware change. FIG. 10 illustrates a subroutine that when the determination at step S91 is no, an electromagnetic clutch for switching the operation of compressor 41 is turned off at step S97. When the determination at step S91 is yes, a target temperature is calculated at step S92 and an on/off operation of the electromagnetic clutch is determined at step S96 so that the operation of compressor 41 is controlled.

When the air-conditioning ECU 7 of the hybrid vehicle is applied to the engine vehicle, the output circuit 5b needs to be removed. Instead of the output circuit 5b, an output circuit for the electromagnetic clutch 49 in FIG. 11B or the electromagnetic valve described in FIG. 11B needs to be newly provided. Accordingly, even in this case, the engine vehicle can be manufactured based on the hybrid vehicle in a low cost.

Figure 11A:
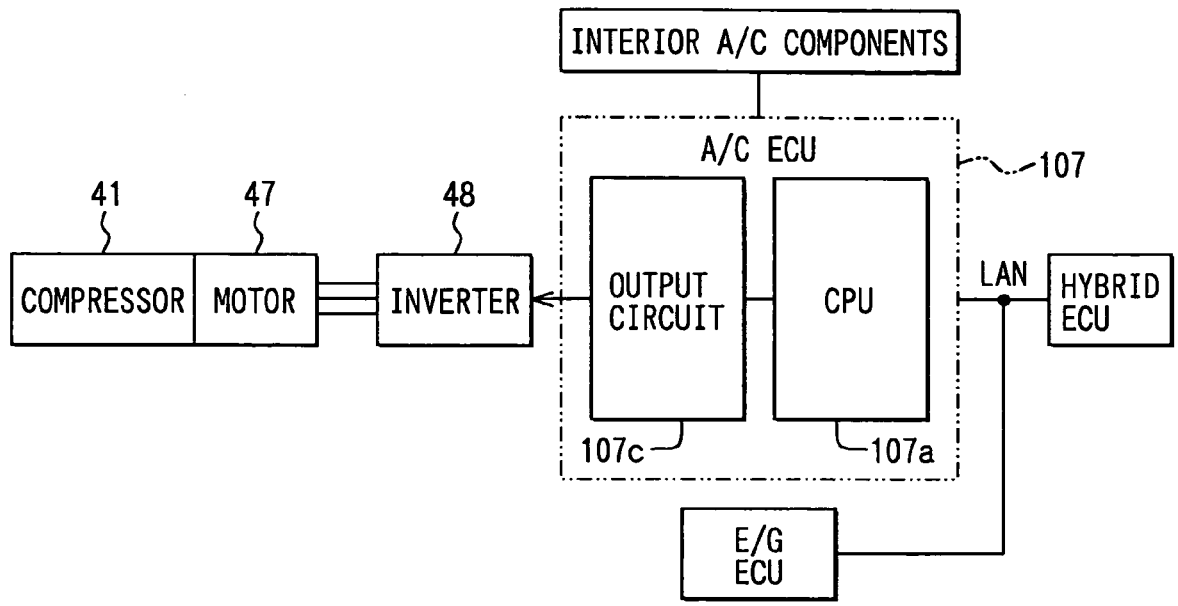
FIG. 11A is a block diagram showing a conventional compressor control system mounted in a hybrid vehicle or an electric vehicle.
Figure 11B:
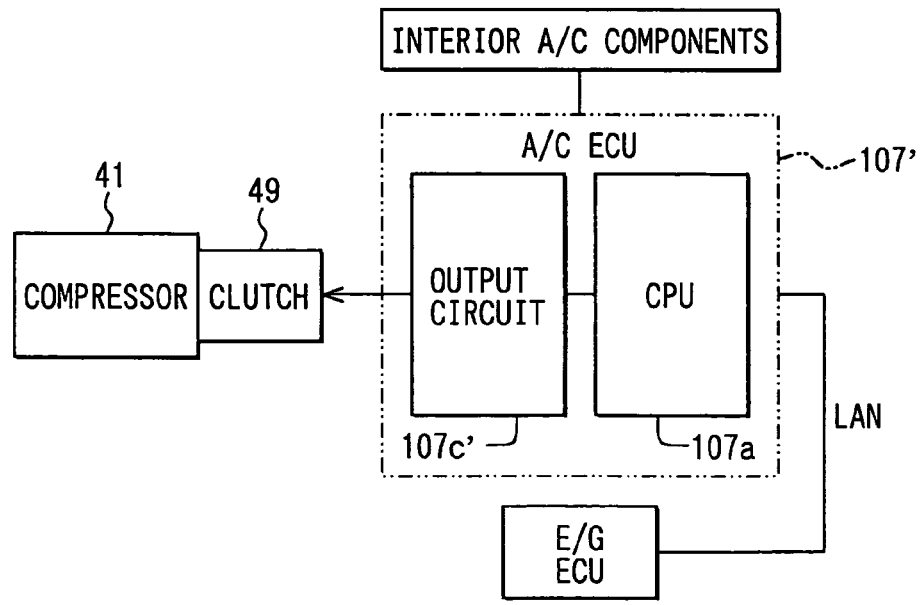
FIG. 11B is a block diagram showing a conventional compressor control system mounted in an engine vehicle which is a manufacturing base of the hybrid vehicle or the electric vehicle.

In addition, the vehicle LAN, which is the existing device of the engine vehicle in FIG. 11B, is directly applied to the communication between the air-conditioning ECU 7 and the hybrid ECU 5 in the hybrid vehicle according to the embodiment. That is, a communication function does not need to be newly provided in the air-conditioning ECU 7. Therefore, hardware design change can be further reduced.

Generally, a high-speed processing ECU is required to the hybrid ECU (driving ECU) 5 for controlling the vehicle driving while an inexpensive ECU, which processes slower than the hybrid ECU 5, is used as the air-conditioning ECU 7 for controlling the air-conditioning. In the embodiment, the rotation speed of the compressor electric motor 47 is controlled by the hybrid ECU 5 with high-speed processing. Therefore, high responsibility of the rotation speed control of the compressor can be achieved compared with the control system in FIG. 11B.

(Other Embodiment)

Although the present invention has been fully described in connection with the preferred embodiment thereof with reference to the accompanying drawings, it is to be noted that various changes and modifications will become apparent to those skilled in the art.

For example, in the above-described embodiment, the compressor inverter 48 is separated from the compressor electric motor 47. However, the compressor inverter 48 can be integrated with the compressor electric motor 47. Further, the compressor inverter 48 can be integrated with the hybrid ECU 5. In addition, the compressor inverter 48 can be integrated with the driving inverter 102.

In the above-described embodiment, the present invention is applied to the hybrid vehicle. However, the present invention can be applied to the electric vehicle which drives only by a battery or a fuel-cell vehicle on which a fuel-cell is mounted. That is, the air-conditioning ECU, which is the existing device of the engine vehicle, can be applied to the fuel-cell vehicle or the electric vehicle only by changing the software without a hardware change.

In the above-described embodiment, the hybrid ECU 5 has the function for controlling the drive switching between the driving electric motor 2 and the engine 1 and the function for controlling the charge and discharge of the high-voltage battery 4a. However, the driving ECU for the vehicle driving according to the present invention is not limited to the above hybrid ECU 5. In the preset invention, any ECU, which is newly provided when the vehicles such as the hybrid vehicle, the electric vehicle and the fuel-cell vehicle are manufactured based on the engine vehicle, can be used as the driving ECU.

The above ECU which is newly provided has at least one of the function for controlling the operation of the electric actuators which are driven when high voltage of the main battery 4a is applied, the function for controlling the drive switching and the function for controlling the charge and discharge of the main battery 4a. For example, the above electric actuator is an electric motor which is mounted in the vehicle and drives an oil-pressure pump in an oil-pressure circuit for operating an oil-pressure actuator.

In the above-described embodiment, the air-conditioning ECU 7 calculates the target rotation speed IVOn, because the signals for calculating the target rotation speed IVOn are inputted to the air-conditioning ECU 7. However, the calculation of the target rotation speed IVOn can be also performed by the hybrid ECU 5.

In the above-described embodiment, the hybrid ECU 5 determines whether the rotation speed of the compressor 41 needs to be restricted. However, the air-conditioning ECU 7 can also perform the above determination.

In the above-described embodiment, the air-conditioning ECU 7 includes the output step S10 in FIG. 4 for outputting the control signal to the hybrid ECU 5. However, the outputting of the control signal includes not only a signal outputting of the control signal but also an outputting in response to an output command signal from the hybrid ECU 5.

Such changes and modifications are to be understood as being within the scope of the present invention as defined by the appended claims.

What is claimed is:

1. A compressor control system for an air conditioner of a vehicle, the vehicle includes:
    a driving electric motor for driving the vehicle;
    a main battery for supplying electric power of a high voltage to the driving electric motor; and
    a driving electronic control unit which has at least one of a function for controlling operation of an electric actuator driven when being applied with the high voltage of the main battery, a function for controlling a drive-power switching of the vehicle between the driving electric motor and an engine of the vehicle and a function for controlling a charge and a discharge of the main battery, the compressor control system comprising:
    a compressor which is provided in a refrigerant cycle of the air conditioner for performing air-conditioning in a vehicle compartment;
    a compressor electric motor for driving the compressor, wherein the compressor electric motor has a rotation speed that is controlled by the driving electronic control unit;
    an air-conditioning electronic control unit to which an air-conditioning signal relevant to the air-conditioning is inputted, and
    a compressor inverter which converts the high voltage from a direct current source to AC voltage with an adjusted frequency or voltage value, and applies the adjusted AC voltage to the compressor electric motor; wherein
    the air-conditioning electronic control unit controls operation of the air conditioner based on the air-conditioning signal;
    the air-conditioning electronic control unit is provided to communicate with the driving electronic control unit;
    the driving electronic control unit controls the rotation speed of the compressor electric motor through the compressor inverter;
    the air-conditioning electronic control unit calculates a target rotation speed of the compressor electric motor based on the air-conditioning signal, and outputs the calculated target rotation speed to the driving electronic control unit; and
    the driving electronic control unit is provided with an output circuit that is capable of converting the target rotation speed input from the air-conditioning electronic control unit to a driving signal for processing the compressor inverter, and output the driving signal converted via the output circuit to the compressor inverter.

2. The compressor control system according to claim 1, wherein the air-conditioning electronic control unit communicates with the driving electronic control unit through a local area network of the vehicle.

3. The compressor control system according to claim 1, wherein
    the air-conditioning electronic control unit has at least one of a function for calculating a target temperature of conditioned air blown into the passenger compartment, a function for determining a blowing amount of the conditioned air, a function for determining an air-outlet mode of the conditioned air and a function for determining an air-suction mode.

4. The compressor control system according to claim 1, wherein:
    the air-conditioning electronic control unit calculates a target rotation speed of the compressor electric motor based on the air-conditioning signal and outputs a signal representing the target rotation speed to the driving electronic control unit; and
    the driving electronic control unit controls the rotation speed of the compressor electric motor based on the signal representing the target rotation speed.

5. A compressor control system for an air conditioner of a vehicle, the vehicle includes:
    a driving electric motor for driving the vehicle;
    a main battery for supplying electric power of a high voltage to the driving electric motor; and
    a driving electronic control unit which has at least one of a function for controlling operation of an electric actuator driven when being applied with the high voltage of the main battery, a function for controlling a drive-power switching of the vehicle between the driving electric motor and an engine of the vehicle and a function for controlling a charge and a discharge of the main battery, the compressor control system comprising:
    a compressor which is provided in a refrigerant cycle of the air conditioner for performing air-conditioning in a vehicle compartment; and
    a compressor electric motor for driving the compressor, wherein the compressor electric motor has a rotation speed that is controlled by the driving electronic control unit; wherein the driving electronic control unit includes means for determining whether a vehicle condition is in a restriction condition where the rotation speed of the compressor needs to be restricted.

6. The compressor control system according to claim 5, wherein the restriction condition is at least one of an overloading state of a vehicle running load and an over-discharging state of the main battery.

7. A compressor control system for an air conditioner of a vehicle, the vehicle includes:
a driving electric motor for driving the vehicle;
a main battery for supplying electric power of a high voltage to the driving electric motor; and
a driving electronic control unit which has at least one of a function for controlling operation of an electric actuator driven when being applied with the high voltage of the main battery, a function for controlling a drive-power switching of the vehicle between the driving electric motor and an engine of the vehicle and a function for controlling a charge and a discharge of the main battery, the compressor control system comprising:
a compressor which is provided in a refrigerant cycle of the air conditioner for performing air-conditioning in a vehicle compartment;
a compressor electric motor for driving the compressor, wherein the compressor electric motor has a rotation speed that is controlled by the driving electronic control unit;
a compressor inverter which is connected to a direct-current power source, and generates alternating-current voltage from an output of the direct-current power source to apply the alternating-current voltage to the compressor electric motor; wherein
the driving electronic control unit controls the rotation speed of the compressor electric motor through the compressor inverter;
the compressor inverter outputs a feedback signal to the driving electronic control unit; and
the driving electronic control unit controls the rotation speed of the compressor electric motor based on the feedback signal.

8. A vehicle comprising:
a driving electric motor for driving the vehicle;
a main battery for supplying electric power of a high voltage to the driving electric motor;
a driving electronic control unit which has at least one of a function for controlling operation of an electric actuator driven when being applied with the high voltage of the main battery, a function for controlling a drive-power switching of the vehicle between the driving electric motor and an engine of the vehicle and a function for controlling a charge and a discharge of the main battery; and
an air conditioner for performing air-conditioning in a vehicle compartment, wherein:
the air conditioner includes a refrigerant cycle including a compressor for compressing refrigerant, and a compressor electric motor for driving the compressor;
the driving electronic control unit controls a rotation speed of the compressor electric; and
the driving electronic control unit includes means for determining whether a vehicle condition is in a restriction condition where the rotation speed of the compressor needs to be restricted.

9. The vehicle according to claim 8, further comprising
an air-conditioning electronic control unit to which an air-conditioning signal relevant to the air-conditioning is inputted, wherein:
the air-conditioning electronic control unit controls operation of the air conditioner based on the air-conditioning signal; and
the air-conditioning electronic control unit is provided to communicate with the driving electronic control unit.

10. The vehicle according to claim 9, wherein:
the air-conditioning electronic control unit calculates a target rotation speed of the compressor electric motor based on the air-conditioning signal and outputs a signal representing the target rotation speed to the driving electronic control unit; and
the driving electronic control unit controls the rotation speed of the compressor electric motor based on the signal representing the target rotation speed.

11. The compressor control system according to claim 5, further comprising
an air-conditioning electronic control unit to which an air-conditioning signal relevant to the air-conditioning is inputted; and
the air-conditioning electronic control unit controls operation of the air conditioner based on the air-conditioning signal;
the air-conditioning electronic control unit is provided to communicate with the driving electronic control unit.

12. The compressor control system according to claim 11, wherein the air-conditioning electronic control unit communicates with the driving electronic control unit through a local area network of the vehicle.

13. The compressor control system according to claim 11, wherein
the air-conditioning electronic control unit has at least one of a function for calculating a target temperature of conditioned air blown into the passenger compartment, a function for determining a blowing amount of the conditioned air, a function for determining an air-outlet mode of the conditioned air and a function for determining an air-suction mode.

14. The compressor control system according to claim 11, wherein:
the air-conditioning electronic control unit calculates a target rotation speed of the compressor electric motor based on the air-conditioning signal and outputs a signal representing the target rotation speed to the driving electronic control unit; and
the driving electronic control unit controls the rotation speed of the compressor electric motor based on the signal representing the target rotation speed.

15. The compressor control system according to claim 5, further comprising
a compressor inverter which is connected to a direct-current power source, and generates alternating-current voltage from an output of the direct-current power source to apply the alternating-current voltage to the compressor electric motor,
wherein the driving electronic control unit controls the rotation speed of the compressor electric motor through the compressor inverter.

* * * * *